(12) United States Patent
Polegato Moretti

(10) Patent No.: US 10,588,377 B2
(45) Date of Patent: *Mar. 17, 2020

(54) INSERT FOR VAPOR-PERMEABLE AND WATERPROOF SOLES

(75) Inventor: Mario Polegato Moretti, Crocetta del Moretti (IT)

(73) Assignee: GEOX S.p.A., Montebelluna, Localita Biadene-(Treviso) (IT)

(*) Notice: Subject to any disclaimer, the term of this patent is extended or adjusted under 35 U.S.C. 154(b) by 1176 days.

This patent is subject to a terminal disclaimer.

(21) Appl. No.: 13/393,041

(22) PCT Filed: Aug. 4, 2010

(86) PCT No.: PCT/EP2010/061352
§ 371 (c)(1),
(2), (4) Date: Feb. 28, 2012

(87) PCT Pub. No.: WO2011/023509
PCT Pub. Date: Mar. 3, 2011

(65) Prior Publication Data
US 2012/0151805 A1  Jun. 21, 2012

(30) Foreign Application Priority Data
Aug. 28, 2009  (EP) ..................................... 09425334

(51) Int. Cl.
A43B 7/12    (2006.01)
A43B 7/06    (2006.01)
B29D 35/14   (2010.01)

(52) U.S. Cl.
CPC ............... *A43B 7/125* (2013.01); *A43B 7/06* (2013.01); *B29D 35/142* (2013.01)

(58) Field of Classification Search
CPC .. A43B 7/06; A43B 7/081; A43B 9/02; A43B 13/28; A43B 13/12; A43B 13/026; A43B 13/145

See application file for complete search history.

(56) References Cited

U.S. PATENT DOCUMENTS 5,815,949 A * 10/1998 Sessa ............................. 36/3 B
6,408,541 B1 * 6/2002 Moretti .......................... 36/12
(Continued)

FOREIGN PATENT DOCUMENTS

CN    1255045 A    5/2000
CN    101484032 A  7/2009
(Continued)

OTHER PUBLICATIONS http://science.howstuffworks.com/life/botany/rubber-info1.htm.*
(Continued)

*Primary Examiner* — Megan E Lynch
(74) *Attorney, Agent, or Firm* — Oblon, McClelland, Maier & Neustadt, L.L.P.

(57) ABSTRACT

An insert for vapor-permeable and waterproof soles, which has a stratified and cohesive monolithic sheet-like structure, which includes a plurality of functional layers made of a polymeric material that is impermeable to water in the liquid state and permeable to water vapor. At least one functional portion of the insert for soles has such a thickness as to give it a penetration resistance of more than approximately 10 N, assessed according to the method presented in chapter 5.8.2 of the ISO 20344-2004 standard.

31 Claims, 5 Drawing Sheets

(56) References Cited

U.S. PATENT DOCUMENTS

| | | | |
|---|---|---|---|
| 6,474,001 B1* | 11/2002 | Chen | 36/55 |
| 6,508,015 B1* | 1/2003 | Rauch | 36/3 B |
| 6,581,303 B1* | 6/2003 | Tuan | 36/3 B |
| 9,032,642 B2* | 5/2015 | Polegato Moretti | A43B 7/06 36/3 R |
| 2001/0010127 A1* | 8/2001 | Polegato Moretti | 36/3 B |
| 2002/0100187 A1 | 8/2002 | Polegato | |
| 2002/0157278 A1* | 10/2002 | Moretti | 36/3 R |
| 2002/0170204 A1* | 11/2002 | Chen | 36/16 |
| 2004/0006888 A1* | 1/2004 | Moretti | 36/3 B |
| 2004/0035022 A1* | 2/2004 | Polegato Moretti | 36/3 B |
| 2005/0000117 A1* | 1/2005 | Polegato Moretti | 36/55 |
| 2005/0241082 A1* | 11/2005 | Moretti | 12/142 V |
| 2006/0147698 A1 | 7/2006 | Carroll et al. | |
| 2006/0162183 A1* | 7/2006 | Polegato Moretti | 36/3 B |
| 2007/0011907 A1* | 1/2007 | Polegato Moretti | 36/3 B |
| 2007/0113359 A1* | 5/2007 | Polegato Moretti | 12/142 V |
| 2007/0136960 A1* | 6/2007 | Doerer et al. | 12/146 B |
| 2007/0180731 A1* | 8/2007 | Polegato Moretti | 36/14 |
| 2007/0271815 A1* | 11/2007 | Moretti et al. | 36/3 B |
| 2007/0277401 A1* | 12/2007 | Young-Chul | 36/30 R |
| 2008/0052956 A1* | 3/2008 | Polegato Moretti | 36/3 A |
| 2008/0209769 A1* | 9/2008 | Polegato Moretti | 36/3 B |
| 2009/0044428 A1* | 2/2009 | Bernardeschi | 36/103 |
| 2009/0172971 A1* | 7/2009 | Peikert et al. | 36/88 |
| 2009/0188134 A1 | 7/2009 | Polegato Moretti | |
| 2009/0199438 A1* | 8/2009 | Polegato Moretti | 36/3 B |
| 2009/0211119 A1* | 8/2009 | Moretti | 36/3 B |
| 2009/0277047 A1* | 11/2009 | Polegato Moretti | 36/3 B |
| 2010/0011624 A1 | 1/2010 | Polegato Moretti | |
| 2010/0050471 A1* | 3/2010 | Kim | 36/29 |
| 2010/0050480 A1* | 3/2010 | Polegato Moretti | 36/3 B |
| 2010/0293814 A1 | 11/2010 | Skaja et al. | |
| 2011/0113655 A1 | 5/2011 | Polegato Moretti | |

FOREIGN PATENT DOCUMENTS

| | | |
|---|---|---|
| JP | 07-327706 A | 12/1995 |
| JP | 08-294403 A | 11/1996 |
| JP | 11-513582 A | 11/1999 |
| JP | 2000-166606 A | 6/2000 |
| JP | 2009-542267 A | 12/2009 |
| WO | WO 97/14326 A1 | 4/1997 |
| WO | 03 106543 | 12/2003 |
| WO | 2007 148365 | 12/2007 |
| WO | 2008 003375 | 1/2008 |
| WO | WO 2008/061710 A1 | 5/2008 |
| WO | WO 2009/042599 A1 | 4/2009 |

OTHER PUBLICATIONS

U.S. Appl. No. 13/002,022, filed Dec. 29, 2010, 2011-0113655, Polegato Moretti.
U.S. Appl. No. 13/393,019, filed Feb. 28, 2012, Polegato Moretti.
Combined Office Action and Search Report dated Jan. 30, 2014 in Chinese Patent Application No. 201080038592.6 (with English language translation).
European Search Report dated Mar. 1, 2010 in EP 09 42 5334 Filed Aug. 28, 2009.
International Search Report dated Nov. 8, 2010 in PCT/EP10/61352 Filed Aug. 4, 2010.
Office Action dated Aug. 5, 2014 in Japanese Patent Application No. 2012-525970 (with English language translation).

* cited by examiner

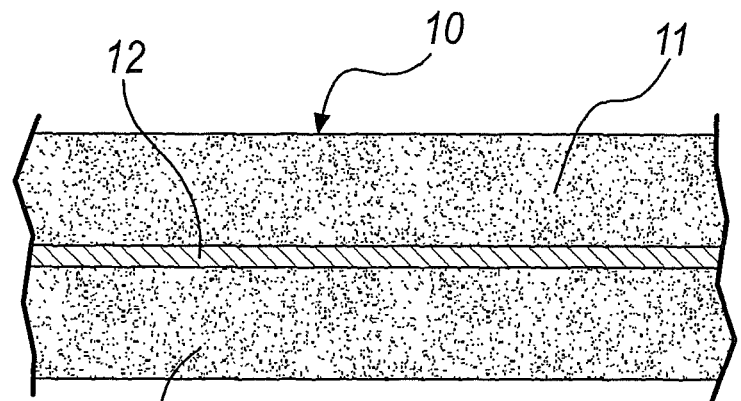
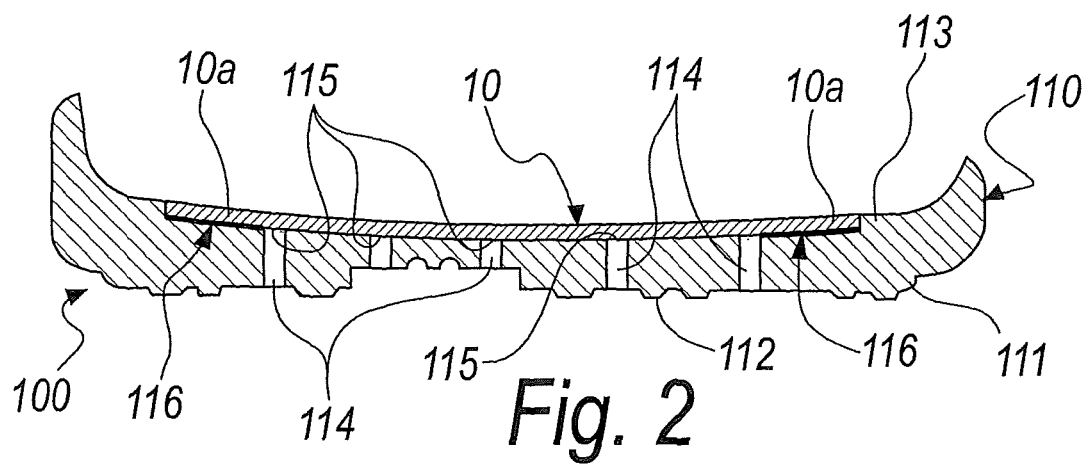
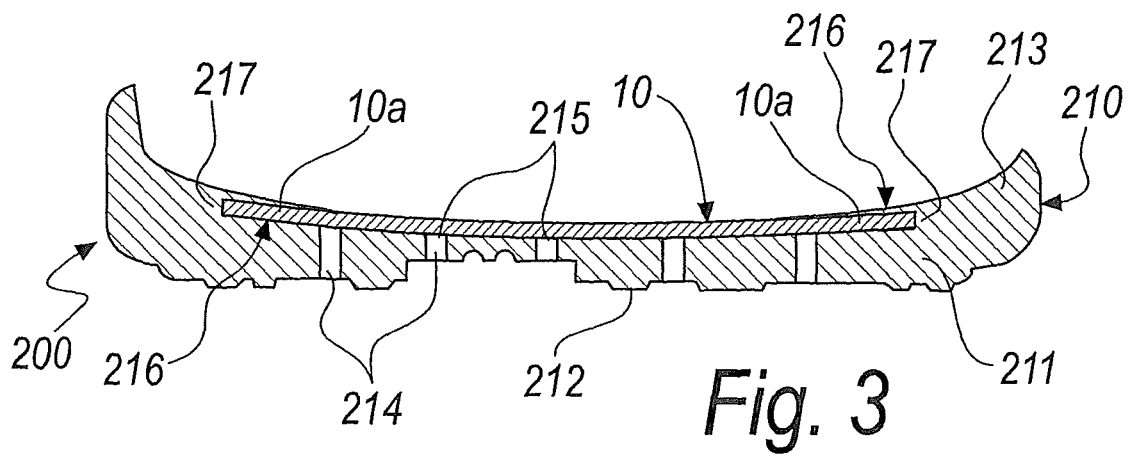

INSERT FOR VAPOR-PERMEABLE AND WATERPROOF SOLES

TECHNICAL FIELD

The present invention relates to an insert for vapor-permeable and waterproof soles.

BACKGROUND ART

As is known, the portion of the foot that has the greatest perspiration effect is the sole.

Therefore, the region of the shoe where moisture produced by perspiration can accumulate most is the interface between the sole of the foot and the sole of the shoe.

Here, the sweat that is produced saturates the air with moisture and mostly condenses, stagnating on the footbed.

Only a marginal fraction of the moisture produced by perspiration diffuses to the sides of the upper and exits from them if they are vapor-permeable.

This effect of stagnation of perspiration in the plantar region is particularly conspicuous in shoes that have a rubber sole; in such cases vapor permeation through the sole is in fact prevented by its total waterproofness.

As is known, the stagnation of sweat in the plantar region produces in the user of the shoe a feeling of discomfort and constitutes a preferential location for the growth of bacterial cultures, which notoriously cause bad odors.

The need to obviate the stagnation of moisture produced by perspiration at the plantar region of shoes is therefore a commonly felt need.

A first attempt to meet this need consists of the solution disclosed in Italian patent no. 1232798.

The teaching contained in said patent consists in dividing the rubber sole into two layers, the lower of which has through micro-holes, and in interposing between them a semipermeable membrane that is joined perimetrically to the two layers, in order to avoid infiltrations of water and thus obtain a sole that is impermeable to water in the liquid state and is permeable to water vapor.

For the sake of simplicity, hereinafter an element with the property of being impermeable to water in the liquid state and permeable to water vapor is indicated as waterproof and vapor-permeable.

The semipermeable membranes that the inventor of Italian patent no. 1232798 teaches to use are for example of the type described in U.S. Pat. Nos. 4,187,390 and 4,194,041 in the name of W. L. Gore or U.S. Pat. No. 6,228,477 in the name of BHA Technologies.

These membranes are provided by means of thin films of expanded polytetrafluoroethylene, e-PTFE, with thicknesses that generally vary from 15 to 70 microns, and are waterproof and vapor-permeable.

Their microstructure is characterized by the presence of dense areas, known as nodes, which are interconnected by elongated filaments, known as fibrils.

These semipermeable membranes, initially conceived for the military sector, have been developed and used in the field of clothing and shoes to avoid the accumulation of water vapor caused by perspiration in items of clothing and provide shoes with uppers with waterproof and vapor-permeable linings.

Since the market of the clothing and shoes sectors has always required soft and comfortable items, in the described applications there is a strong need to make sure that the membrane, understood as a functional layer, does not compromise these characteristics.

This requirement has developed into an actual technical prejudice, which has entailed the use of membranes provided in low thicknesses in order to be laminated with support and/or aesthetic finishing materials, such as fabric or leather, so as to obtain finished laminates that have enhanced characteristics of flexibility, ease of bending, softness, surface slipperiness, compressibility and extensibility and low weight per unit surface.

However, the films that provide these membranes have poor characteristics of mechanical strength, indeed due to their low thickness.

Indeed, it should be noted that the value of resistance of the laminate derives mainly from the characteristics of the layer of fabric or of the support with which the membrane is coupled.

In particular, available films of polymeric material, used to provide said membranes as mentioned, have thicknesses generally from 15 to 70 microns, which give them limited penetration resistance, i.e., less than 5 N. The expression "penetration resistance" is used to reference the characteristic defined by a measurement performed according to the method presented in the ISO 20344-2004 standard in chapter 5.8.2, "Determination of the penetration resistance of the sole" related to safety shoes.

This limited mechanical resistance to penetration has led the inventor of said Italian patent no. 1232798 to prevent contact of the membrane with foreign objects by limiting the diameter of the holes of the sole which the membrane faces.

However, this solution has proved to limit drastically the area of the sole assigned to vapor permeation.

The teaching contained in Italian patent no. 1282196 by the same Applicant proposes a solution that is aimed at overcoming these drawbacks.

This patent discloses a shoe with a sole made of elastomer which is provided with through holes and comprises a midsole that comprises a waterproof and vapor-permeable membrane superimposed on a protective layer, preferably made of felt, which is treated so as to be water-repellent.

Since the protective layer is not waterproof, it is not possible to perform a direct seal of the midsole with the sole, but a perimetric waterproof element is used which provides a sealing bridge between the waterproof and vapor-permeable membrane and the sole.

This invention, while allowing effective protection of the membrane against the penetration of external objects, has some aspects that can be improved.

In particular, the connection of the protective layer to the membrane, in order to allow an effective protection thereof, must occur by way of their intimate adhesion.

For this purpose, adhesives and glues are used which, while not covering all of the surface of the membrane, delimit the vapor-permeable portion of the part that they affect.

Moreover, the protective layer itself, though being vapor-permeable, is an obstacle to the passage of water vapor from the inside to the outside of the shoe through the midsole.

This drawback increases when, during use of the shoe, the protective layer progressively loses its characteristics of water-repellence and therefore tends to become impregnated with water and/or mud or other types of dirt, absorbed through the holes of the tread, compromising its vapor permeability.

A drawback of both of said proposed solutions consists in that during use the cyclic flexing and traction to which the midsole is subjected during walking tends to cause progressive wear and tear of the membrane, thus causing a loss of waterproofness at the sole.

In order to obviate this drawback, Italian patent no. 1282196 teaches to provide soles that have small holes, for example with dimensions of 1.5-2.0 mm, that are sufficiently spaced so as to not compromise their structural stiffness.

In this manner, the sole supports the midsole rigidly enough to contrast the tear of the membrane.

However, the portion of sole that can be crossed by water vapor is limited indeed by the rarity and narrowness of the holes with which it is provided.

A further solution, aimed at proposing a compromise between the need to contrast the tear of the membrane and the need to allow effective disposal of water vapor produced by perspiration through the sole, is described in Italian patent no. 1334928 by the same Applicant.

This patent discloses a sole having a structure that comprises a supporting layer which, at least in one macroportion, is made of mesh, felt or other diffusely perforated material.

A membrane made of material that is waterproof and permeable to water vapor is associated in an upward region with the supporting layer so as to cover at least the macroportion thereof.

Moreover, a sole made of polymeric material, with at least one macrohole that passes through at the macroportion, is joined so as to form a seal to the membrane and to the supporting layer at the perimeter of the macroportion.

This patent also contains the teaching of structuring the membrane by reinforcing it with protective layers and tear-resistant layers, made for example of nylon mesh intimately associated with the waterproof and vapor-permeable membrane.

It is also known to reinforce the membrane with high-strength layers made for example of Kevlar fabric.

Accordingly, the presence of the macrohole allows to define a large surface of the membrane that is adapted for heat exchange and for the exchange of water vapor with the outside of the shoe; simultaneously, the loss of structural stiffness of the sole is compensated, to contrast the tear of the waterproof and vapor-permeable membrane, by the supporting layer.

The advantage provided by having a large portion of sole free for vapor permeation is reduced, however, by the obstacle to the passage of water vapor that is constituted by the presence of the several layers that compose the supporting layer.

A further solution is described in U.S. Pat. No. 6,508,015 by Rauch Max.

This patent discloses a sole provided by means of a two-layer structure, respectively an elastic upper layer, which is permeable to water vapor, and a lower layer, which covers less than 70% of the upper layer and also acts as support and tread.

In this case, the vapor-permeable activity of the sole is ensured by the microporous structure of the upper layer and by the open shape of the lower layer.

The microporous structure of the upper layer is not waterproof and is made for example of sintered plastic material or by means of woven or non-woven structures made of synthetic material.

Although this solution proposes a large vapor permeation area of the sole, it does not allow to obtain a sole that is effectively waterproof, not even by adopting the refinements suggested in the cited patent, i.e., by treating the microporous material of the upper layer so as to make it hydrophobic or by providing a further upper layer formed by a thin waterproof membrane.

It has in fact been observed that the hydrophobic treatment of the sintered material does not make the upper layer sufficiently or stably waterproof.

Besides, the association of a waterproof membrane to the upper layer has the same drawbacks described as regards the solution that has a membrane supported by a protective layer.

Moreover, a sole provided according to the teaching of this patent, by having the microporous upper layer left extensively exposed by the lower supporting layer, tends to have a progressive degeneration of the upper layer upon contact with water, which is absorbed by capillary action together with the dirt that said water can convey.

The upper layer, once it is fully impregnated with dirt, is no longer vapor-permeable and can rot.

This drawback becomes all the more evident as the porosity of the material that constitutes the upper layer increases.

DISCLOSURE OF THE INVENTION

The aim of the present invention is to provide an insert for soles that is waterproof and vapor-permeable and obviates the drawbacks noted above, allowing to provide waterproof and vapor-permeable soles that are capable of dissipating larger quantities of water vapor than currently known soles, at least for an equal durability over time of the waterproofness characteristic.

Within this aim, an object of the invention is to propose an insert for soles that simplifies both its assembly and sealing process and its construction, making its structure more flexible, with respect to currently known soles.

Another object of the invention is to propose an insert for soles that has a greater resistance to contamination by fatty substances with respect to currently known inserts for soles.

Another object of the invention is to provide an insert for soles that has a greater resistance to degradation by solvents with respect to currently known sole inserts.

Another object of the invention is to provide an insert for soles that has a high mechanical strength, so that there is no need for a further element with perforation-resistance characteristics.

Another object of the invention is to provide an insert for soles that has a reduced tendency to absorb dirt, so that it can be cleaned more easily than currently known inserts.

Another object of the invention is to propose an insert for soles that is structurally simpler.

Another object of the invention is to provide an insert for soles that is easy to use and can be manufactured with relatively low costs.

This aim, as well as these and other objects which will become better apparent hereinafter are achieved by an insert for vapor-permeable and waterproof soles, characterized in that it has a stratified and cohesive monolithic sheet-like structure, which comprises a plurality of functional layers made of a polymeric material that is impermeable to water in the liquid state and permeable to water vapor, at least one functional portion of said insert for soles having such a thickness as to give it a penetration resistance of more than approximately 10 N, assessed according to the method presented in chapter 5.8.2 of the ISO 20344-2004 standard.

BRIEF DESCRIPTION OF THE DRAWINGS

Further characteristics and advantages of the invention will become better apparent from the description of a preferred but not exclusive embodiment of the insert for soles according to the invention, illustrated by way of non-limiting example in the accompanying drawings, wherein:

FIG. 1 is an enlarged-scale sectional view of a detail of an insert for soles, according to the invention;

FIGS. 2 to 7 and 8 to 10 are longitudinal sectional views of seven structures of soles in which an insert for soles according to the invention is used;

Figure 4:
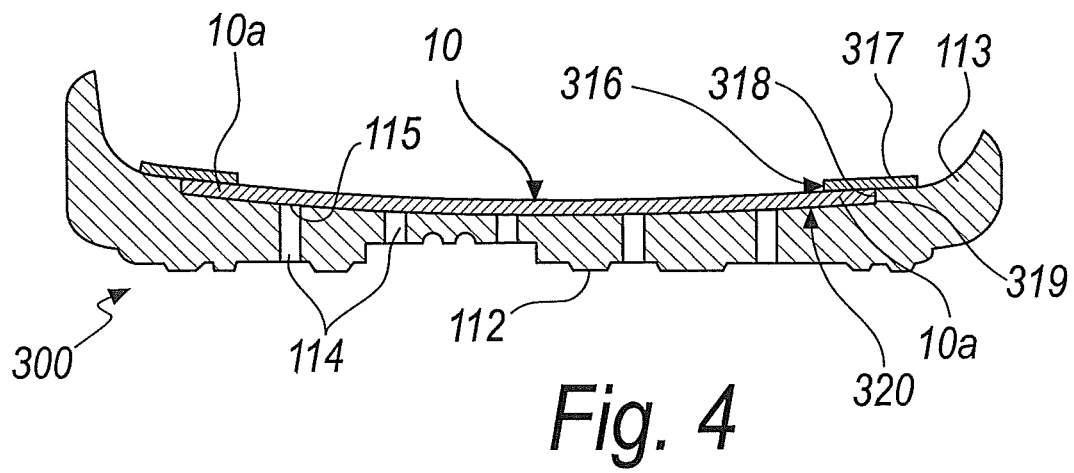

It is noted that anything found to be already known during the patenting process is understood not to be claimed and to be the subject of a disclaimer.

WAYS OF CARRYING OUT THE INVENTION

With reference to the figures, the reference numeral 10 generally designates an insert for vapor-permeable and waterproof soles, a particularity of which consists in that it has a stratified and cohesive monolithic sheet-like structure, comprising a plurality of functional layers 11 made of a polymeric material that is impermeable to water in the liquid state and permeable to water vapor.

The term "sheet-like" is used to reference the shape characteristic of a structure that has one dimension that is greatly reduced with respect to the other two, said dimension being its thickness, which in any case, according to what is commonly understood so as to distinguish a sheet from a foil or a membrane, remains substantial.

However, one should not understand that this shape characteristic in itself compromises the ability of the insert to bend or flex.

According to the invention, the insert for soles 10 has such a thickness as to give it a penetration resistance of more than approximately 10 N, assessed according to the method presented in chapter 5.8.2 of the ISO 20344-2004 standard related to safety shoes.

Said testing method consists in obtaining a specimen of the material to be measured and in subjecting it to penetration by a nail with a diameter of 4.50±0.05 mm with a truncated tip and with the indicated shape and proportions.

The tip of the nail has a minimum hardness of 60 HRC.

The penetration speed of the nail is set to 10±3 mm/min until the tip has penetrated the specimen completely.

The maximum measured force value, expressed in newtons N, produced by the penetration of the material is recorded.

The test is performed on four specimens and the lowest of the four recorded values is assigned as the penetration resistance value of the tested material.

In a substantially equivalent manner, a first constructive variation of the insert for soles according to the invention, not shown in the accompanying figures, has a functional portion which, according to the method presented in chapter 5.8.2 of the ISO 20344-2004 standard, has a penetration resistance of more than approximately 10 N.

Moreover, likewise, a second constructive variation of the insert for soles according to the invention, not shown in the accompanying figures, has more than one of said functional portions.

Said functional portions are preferably adapted to affect one or more portions of a sole that correspond or corresponds to the regions of greater perspiration of the sole of the foot of the user.

Preferably, said polymeric material is macroporous expanded polytetrafluoroethylene, e-PTFE.

In alternative embodiments of the insert for soles 10, according to the invention, which are not described further, said polymeric material is selected alternatively among, polyurethane PU, polyethylene PE, polypropylene PP, polyester and the like.

Advantageously, the insert for soles 10 comprises an auxiliary layer 12 which is permeable to water vapor and is between functional layers 11.

With particular reference to FIG. 1, such figure illustrates by way of example a detail of an insert for soles 10, which comprises two functional layers 11 between which an auxiliary layer 12 is interposed.

Depending on the contingent requirements, different embodiments of an insert for soles according to the invention, not shown in the accompanying figures, can comprise more than two functional layers 11 with auxiliary layers 12 inserted therebetween.

In particular, said auxiliary layers 12 conveniently are made of material that is structured with fibers according to a woven or non-woven fabric configuration.

Moreover, the auxiliary layers 12 are conveniently made of a material selected among polyolefins, preferably polyethylene and polypropylene,
nylon,
polyester,
aramid fibers and
fluoropolymers.

More particularly, an insert for soles 10 according to the invention can be provided, for example, by means of a production process that consists of a step for extrusion in paste form,
a stratification step,
an expansion step and
a sintering step.

A step for preparing for extrusion precedes the step for extrusion in paste form and provides for the mixing of fine powder of PTFE with a liquid lubricant so as to form a paste of PTFE that can be extruded.

In general, said liquid lubricant is of a type capable of wetting the surface of the fine powder of PTFE and can be removed from it for example by evaporation or extraction.

Said lubricant is conveniently a substance selected among paraffin naphtha, white mineral oil, toluene, xylene or other hydrocarbons, alcohols, ketones, esters or mixtures of these substances.

In particular, said lubricant is selected conveniently among those known commercially as ISOPAR™ by the Exxon Chemical Company and SHELLSOL by Shell Chemicals.

During the extrusion step, the paste of PTFE and liquid lubricant is extruded to obtain a foil.

This foil, during a step for preparation for expansion, is then wound into a roller and then cold-calendered.

During cold calendering, the foil of extrudate undergoes a thickness reduction, obtaining a thinner foil that is elongated longitudinally and transversely and is adapted to constitute a functional layer 11.

The stratification step consists in superimposing, in close contact, a certain number of thin foils thus obtained, still impregnated with liquid lubricant, in order to make them adhere to each other so as to promote the formation of a structure with nodes and fibrils through the interfaces between the adhered foils, thus obtaining their cohesion.

The cohesion among the foils can be enhanced by means of a compression, for example by calendering, of the stratification of foils, so as to obtain a stratified and cohesive sheet.

Said stratified and cohesive sheet thus obtained is dried, for example by evaporation of the liquid lubricant from the extrudate.

During this stratification step it is optionally possible to interpose between at least two foils at least one intercalary element adapted to constitute the auxiliary layer 12.

This evaporation is provided by passing the sheet on a roller or cylinder that is kept at a temperature comprised between 200° C. and 300° C.

In this manner, the liquid lubricant evaporates rapidly.

As an alternative, the lubricant can be eliminated by extraction, as known.

Simultaneously or after the drying step, the expansion step is performed and consists in submitting to traction the stratified and cohesive PTFE sheet at least in a longitudinal direction.

This expansion increases further the porosity of the material, further increasing its strength and orienting its fibrils in the direction of traction. After longitudinal expansion, the stratified and cohesive sheet can be expanded transversely as well, keeping it at a temperature comprised for example between 40° C. and 100° C., in order to further increase its porosity.

The sintering step provides for heating the stratified and cohesive sheet to a sintering temperature comprised between the crystalline melting point and the degradation temperature of the material of which it is made.

Therefore, in particular, said sintering temperature, for PTFE, is comprised between 327° C., which is the crystalline melting point and 400° C., which is the degradation temperature.

The sintering time, i.e., the time for which said sintering temperature is maintained, is for example comprised between 10 seconds and 3 minutes, so as to obtain sintering of the PTFE polymer.

This sintering is performed by means of the passage of the stratified and cohesive sheet on a roller that is heated to the sintering temperature, each section of the stratified and cohesive sheet remaining in contact with the roller for the sintering time.

While it passes over said heated roller, the stratified and cohesive sheet is tensioned in order to contrast its shrinkage facilitated by the sintering temperature.

The sintering thus performed increases significantly the strength properties of the material but reduces its elasticity.

The directional orientation of the fibrils is mostly determined by the calendering and expansion directions.

The diameter and the distance of the fibrils of the stratified and cohesive sheet of e-PTFE thus obtained are determined by the dynamics of the expansion step, while its porosity depends on the dimensions of the interstitial spaces between the fibrils formed in the expansion and sintering steps.

The insert for soles 10, according to the invention, is obtained by cutting the stratified and cohesive sheet thus obtained.

According to the invention, an insert for soles 10, as mentioned, conveniently has a thickness that is comprised substantially between 0.5 mm and 5 mm and is preferably uniform.

In said first and second constructive variations, the functional portion or portions advantageously has or have a thickness comprised substantially between 0.5 mm and 5 mm which is preferably uniform.

Surprisingly, these thicknesses give the insert for soles 10 according to the invention an effective resistance to contamination by fatty substances and contaminants of expanded PTFE.

Generally, in the presence of intense physical activity and therefore in the presence of intense perspiration, surface-active agents, as also described in U.S. Pat. No. 4,194,041, contained in sweat, can in fact penetrate gradually a thin film of expanded PTFE, cover its internal surfaces and cause a loss of waterproofness thereof due substantially to the capillary wicking of said substances within the structure of the membrane.

The effect of contamination caused by perspiration on ordinary waterproof and vapor-permeable membranes and on an insert for soles according to the invention was tested by following the procedure described in the cited U.S. Pat. No. 4,194,041.

Human sweat is collected by wringing a wet cotton undershirt used to perform an intense physical effort.

25 ml of liquid sweat are poured into a container that has an opening with a diameter of 60 mm.

A sample of material of the insert for soles, according to the invention, is associated so as to seal the opening of the container, by means of rubber gaskets.

The container is turned upside down and left to hang in standard atmospheric conditions of 20° C. and 65% relative humidity until the sweat has evaporated completely through the sample.

After two days, needed for all the sweat to disappear from the container, the sample surprisingly shows no signs of contamination.

Vice versa, when testing the same procedure on a sample of traditional e-PTFE membrane, the sample is dark and visibly contaminated.

A second test of the contamination resistance of samples of insert for soles according to the invention was performed by depositing on said samples and on samples of traditional e-PTFE membranes, for comparison, a quantity of 1.0 ml of oil.

The traditional pure e-PTFE membrane showed immediate contamination, losing its white color and becoming transparent, allowing substantial instantaneous passage of the oil.

Vice versa, the samples of insert for soles, according to the invention, surprisingly did not show changes in color and after 72 hours no passage of oil had occurred.

The insert for soles 10 according to the invention advantageously is impermeable to water, since it has no through passage points when subjected to a pressure of at least 1 bar held for at least 30 seconds.

More particularly, waterproofness is assessed as resistance of the sample to penetration of water under pressure, according to the EN1734 standard.

A sample of material is fixed to as to close a container provided with an inlet for water under pressure.

The container is filled with water, so as to submit the face of the sample of material that is directed into the container to a hydrostatic pressure of 1.0 bar.

This condition is maintained for 30 seconds.

The sample is blocked between the opening of the container and a retaining ring, both being covered by sealing gaskets made of silicone rubber.

Pressurization is obtained by forcing into the container water that originates from a tank by means of a flow of compressed air.

The compressed air is adjusted by a valve with a pressure gauge on which the pressure reached is shown.

The face of the sample that is external to the container is observed.

The absence of crossing points, which consist of the formation, on said surface, of drops having a diameter between 1 mm and 1.5 mm, indicates the waterproofness of the sample.

If it is necessary in order to avoid the deformation of the sample, a grid is fixed thereon which has a square mesh with a side of no more than 30 mm and is made of synthetic material and provided by means of filaments measuring 1 to 1.2 mm in diameter.

An insert for soles 10 according to the invention preferably further has a bursting strength that is at least equal to 8 kgf/cm$^2$, determined according to the method described in the ASTM D3786 standard.

This test is aimed at giving indications regarding the mechanical strength of the insert, simulating the damage to the material due to an intensification of the pressure that acts on a limited area.

In order to assess bursting strength according to the ASTM D3786 standard, a sample with a diameter of 125 mm of test material is placed and blocked above a diaphragm made of synthetic rubber, which has been made to expand by a fluid under pressure, up to the bursting point of the sample.

The bursting strength of the sample is given the value of the difference between the total pressure required to make the sample burst and the calibration pressure, needed in order to expand the diaphragm; it is defined and measured in kilograms-force per square centimeter [kgf/cm$^2$].

The test is conducted on ten samples and the average of the measurements is assumed as the value of the bursting strength of the tested material.

In particular, the hydraulic pressure applied to the synthetic rubber diaphragm with a diameter of 48 mm and a thickness of 1.80 mm, is obtained by forcing a fluid constituted by 96% pure glycerin, by means of a piston, into the pressure chamber of the test apparatus.

According to the invention, an insert for soles conveniently has a permeability to water vapor that is at least equal to 9 mg/cm$^2$·h, determined according to the method presented in chapter 6.6 of the ISO 20344-2004 standard.

The ISO 20344-2004 standard, in chapter 6.6, "Determination of water vapour permeability", related to safety shoes, describes a test method that consists in fixing a sample of the material being tested so as to close the opening of a bottle that contains a certain quantity of solid desiccant, i.e., silica gel.

The bottle is subjected to a strong air stream in a conditioned atmosphere.

The bottle is made to turn so as to stir the solid desiccant and optimize its action of drying the air contained in the bottle.

The bottle is weighed before and after the test period in order to determine the mass of humidity that has passed through the material and has been absorbed by the solid desiccant.

Permeability to water vapor, expressed in milligrams per square centimeter per hour [mg/cm$^2$·h] is then calculated on the basis of the mass of humidity that has been measured, of the area of the opening of the bottle and of the test time.

The insert for soles 10 according to the invention further conveniently has a tear strength at least equal to 10 N, determined according to the method presented in the EN13571 standard.

Tear strength, understood as the average force needed to propagate a cut in a sample, is measured by means of an adjustable dynamometer, which acts on the sample at a constant crosshead speed of 100 mm/min.

Six samples of the material being tested are submitted to the test, three having the cut arranged parallel to the longitudinal direction, also known as CAL, and defined as the direction of extrusion of the material or as the warp direction of the fabric, and three having the cut arranged transversely, also known as PAL, at right angles to the longitudinal direction.

The sample, which has the characteristic trouser-like shape, is arranged on a plane between the clamps of the dynamometer so that the cut is perpendicular to the direction of traction.

The sample is subjected to traction until it tears.

The value of the traction force in relation to the movement is recorded and charted.

Tear strength, expressed in newtons N, is calculated as the arithmetic mean of the two arithmetic means TSCAL and TSPAL respectively of the traction forces recorded in the CAL and PAL tests.

Advantageously, an insert for soles 10, according to the invention, has, for thicknesses thereof comprised between 1 mm and 5 mm, an abrasion resistance that corresponds to a maximum mass loss of 250 mg, determined according to the method presented in the EN12770 standard.

This value of resistance allows to use an insert for soles 10 as a tread or, during use, in contact with the ground.

Abrasion resistance, understood as the resistance to wear caused by mechanical action applied to a surface of a sample, in accordance with the EN 12770 standard, for soles of shoes, is measured with an abrasion tester.

A sample of material to be tested is made to slide longitudinally on a drum with a diameter of 150 mm and a length of 500 mm, which rotates at a speed of 40 rpm and on which an abrasive cloth is fixed.

The advancement of the sample is 4.20 mm for each turn of the drum.

The abrasive cloth, covered with 60-grit aluminum oxide, has an average thickness of 1 mm and is uniformly associated with the drum.

This abrasive surface must cause a loss of mass of a standard reference rubber comprised between 180 mg and 220 mg, on an abrasion path of 40 m.

The sample is cylindrical, with a diameter of 16 mm and a minimum height of 6 mm.

The test is performed on three samples and the average of the measurements is assigned to the abrasion resistance value.

For materials having a density of less than 0.9 grams per cubic centimeter [g/cm$^3$], the result of the abrasion test is expressed as relative loss of mass in milligrams [mg]; otherwise, for materials having a density of more than 0.9 grams per cubic centimeter [g/cm$^3$], the result is expressed as loss of volume in cubic millimeters [mm$^3$], using the value of the volume mass (density) of the material as well for the calculation.

In particular, the samples obtained from an insert for soles 10 according to the invention, having a density of 0.7 g/cm$^3$, have shown an abrasion resistance, which corresponds to a loss of relative mass of less than 250 mg, assessed along an abrasive path of 20 m and by doubling the found value.

This abrasion resistance is comparable to that of an expanded material, such as ethyl vinyl acetate, EVA, or polyurethane, PU, commonly used in the provision of soles for shoes.

An insert for soles 10 according to the invention, subjected to the tests described above, surprisingly has the characteristics summarized in the following Table 1.

TABLE 1

| Thickness | Penetration resistance [N] | Permeability to water vapor [mg/cm² · h] | Contamination | Bursting strength [kgf/cm²] | Tear strength [N] | Abrasion resistance [mg] |
|---|---|---|---|---|---|---|
| 0.6 mm | 37 | 21.7 | NO | 13.5 | 10.0 | n/a |
| 1.0 mm | 40 | 18.7 | NO | 19.1 | 57.5 | 230 |
| 1.6 mm | 61 | 12.4 | NO | 24.1 | 63.1 | 210 |
| 2.0 mm | 29 | 12.5 | NO | 13.6 | 40.9 | 202 |
| 2.8 mm | 55 | 9.3 | NO | 20.7 | 110.5 | 240 |

The use of an insert for soles 10 according to the invention is as follows.

With particular reference to FIG. 2, an insert for soles 10, according to the invention, is used in a first waterproof and vapor-permeable sole structure 100 for shoes.

Said first sole structure 100 comprises a sole body 110, which has a lower portion 111, provided with a tread 112, and an upper portion 113 that accommodates an insert for soles 10 according to the invention.

Advantageously, the sole body 110 is made of polymeric material, preferably ethyl vinyl acetate, EVA, vulcanized rubber, polyurethane, PU, thermoplastic material, as thermoplastic polyurethane, TPU, or thermoplastic rubber, TR.

A plurality of openings 114 pass through the body of the sole 110 from its lower portion 111 to its upper portion 113, where their upper ends 115 are covered by the insert for soles 10.

A seal 116 is provided at the peripheral region 10a of the insert for soles 10 for its waterproof connection to the upper portion 113 of the sole body 110.

The seal 116 can be provided for example by gluing with pressing of the body of the sole 110 against the insert for soles 10, or by adhesion by way of a method known as high-frequency electrofusion adhesion or by injection-molding of the body of the sole 110 on the insert for soles 10.

Said seal 116 prevents the infiltration of water in the liquid state between the insert for soles 10 and the body of the sole 110.

Alternative embodiments of the first sole structure 100, not described further and not shown in the drawings, have one or two of said openings, which are large with respect to the body of the sole and are covered by the insert for soles according to the invention, sealed perimetrically to the body of the sole, as described.

With particular reference to FIG. 3, it describes a second sole structure 200, which is co-molded onto an insert for soles 10 according to the invention.

Said second sole structure 200 comprises a sole body 210, preferably made of polymeric material, which has a lower portion 211 provided with a tread 212, and an upper portion 213 that accommodates the insert for soles 10.

A plurality of openings 214 pass through the sole body 210 from its lower portion 211 to its upper portion 213, where their upper ends 215 are covered by the insert for soles 10.

A seal 216 is provided perimetrically to the insert for soles 10 to provide its waterproof connection to the upper portion 213 of the body of the sole 210.

Said seal 216 comprises a perimetric frame 217 that is substantially C-shaped, in a single body with the sole body 210, and wraps around the peripheral region 10a of the insert for soles 10, to which it adheres in a waterproof manner.

In particular, the peripheral region 10a has three faces in contact with the perimetric frame 217.

It should be noted that is sufficient for even just one of said faces to be connected in a waterproof manner to the perimetric frame 217.

The provision of the second structure 200 comprises a step in which the polymeric material adapted to form the sole body 210 is injected or poured in the fluid state into a mold in which the insert for soles 10 is arranged, adhering thereto and forming the perimetric frame 217.

A third sole structure 300, illustrated by way of non-limiting example in FIG. 4, is a constructive variation of the first sole 100, where the seal 116 is replaced with a seal 316 that comprises a sealing element 317, which is advantageously shaped like a perimetric annular band.

The sealing element 317, in alternative embodiments, not shown in the accompanying figures, is shaped so as to cover completely the insert for soles 10 and is perforated at the portion assigned to vapor permeation.

The sealing element 317 is made of waterproof polymeric material, preferably ethyl vinyl acetate, EVA, polyurethane, PU, polyvinyl chloride, PVC, or rubber.

The sealing element 317 covers, connecting thereto in a waterproof manner, at least the adjacent perimetric edges 318 and 319 respectively of the insert for soles 10 and of a recess 320 that is shaped complementarily thereto, and is adapted to accommodate it and is provided on the upper portion 113.

Figure 5:
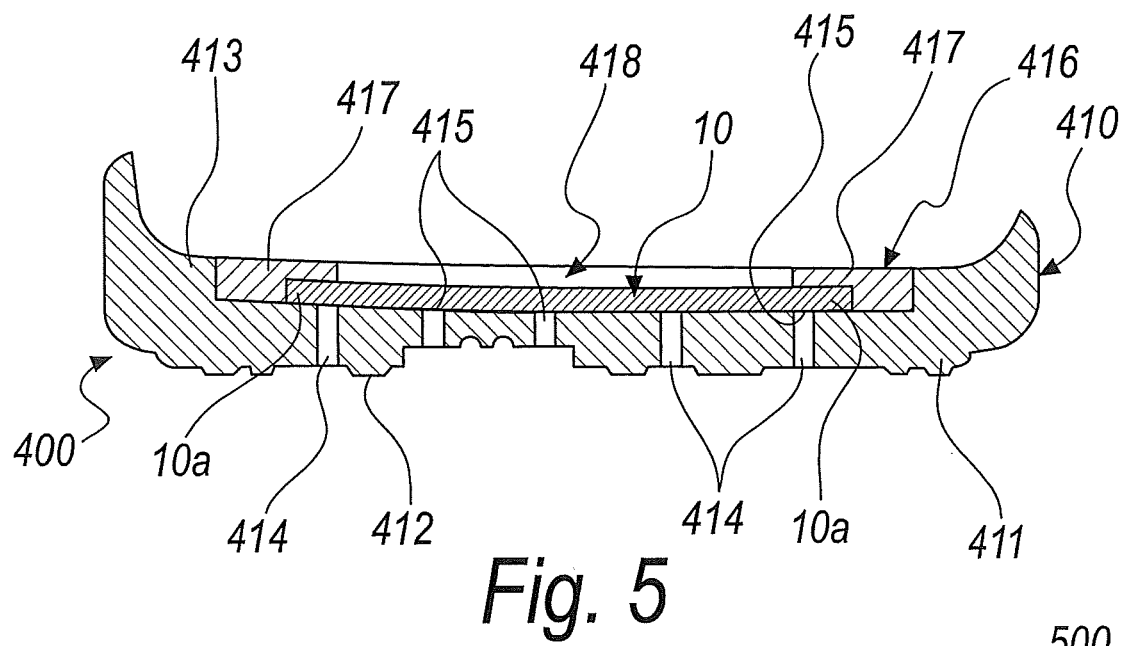

With particular reference to FIG. 5, a fourth waterproof and vapor-permeable sole structure 400 comprises a sole body 410, preferably made of polymeric material, which has a lower portion 411 that is provided with a tread 412 and an upper portion 413.

A plurality of openings 414 pass through the sole body 410 from its lower portion 411 to its upper portion 413, and upper ends 415 of the openings 414 lead out from the upper portion 413.

The upper portion 413 is shaped so as to accommodate a composite insert 416, which comprises the insert for soles 10 according to the invention.

The composite insert 416 further comprises a perimetric functional rim 417 made of polymeric material, which is preassembled to the insert for soles 10 in a waterproof manner, for example by overmolding, gluing with hydrolysis-resistant adhesives, or by association by high-frequency electrofusion.

Conveniently, said perimetric functional rim 417 surmounts the peripheral region 10a of the insert for soles 10.

The perimetric functional rim 417 allows to protect the stratified structure of the insert for soles 10 in the region of the waterproof seal, in particular, in the presence of auxiliary layers 12 between functional layers 11, contrasting its delamination.

Preferably, the composite insert 416 further comprises a filler 418, which is superimposed on the insert for soles 10 and is surrounded by the perimetric functional rim 417 so as to compensate for the step formed by its portion that surmounts the peripheral region of the insert for soles 10.

The filler 418 is preferably made of felt or perforated polymeric material and conveniently has a significant vapor-permeable structure, which is for example porous, diffusely perforated or lattice-like.

In alternative embodiments, not shown in the accompanying figures, said perimetric functional rim also affects the central region of the insert for soles, also performing the function of said filler.

The composite insert 416 is sealed impermeably at least perimetrically to the upper portion 413 of the sole body 410, conveniently by adhesive bonding.

Figure 6:
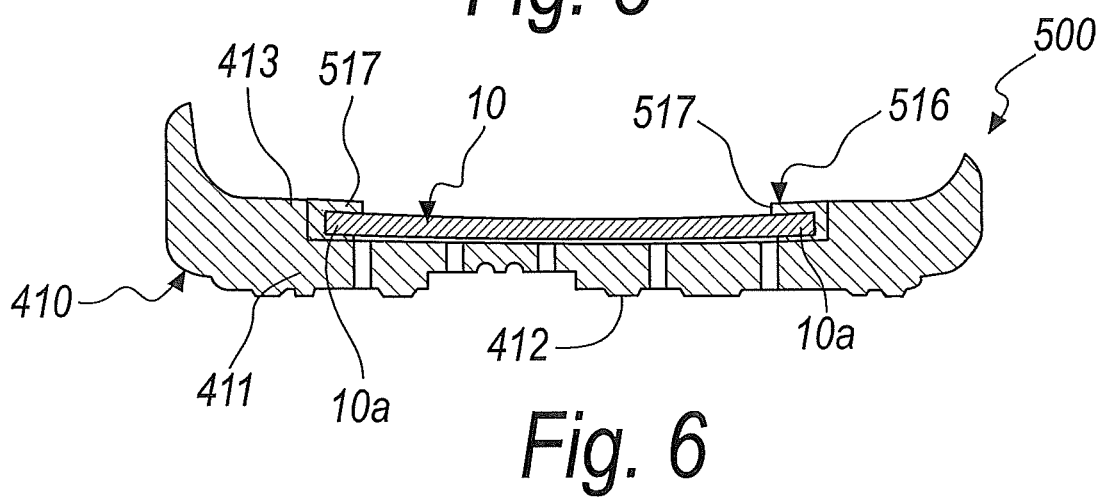

FIG. 6 illustrates, by way of non-limiting example, a fifth sole structure 500 which constitutes a constructive variation of the fourth sole 400.

Said fifth sole structure 500 comprises a composite insert 516 which is sealed at least perimetrically to the body of the sole 410.

The composite insert 516 comprises an insert for soles 10 according to the invention, whose peripheral region 10a is associated in a waterproof manner with a C-shaped welt 517, conveniently made of polymeric material, which wraps around it.

The welt 517 is preferably molded onto the insert for soles 10, provided by microinjection thereon or by high-frequency electrofusion of a film of polymeric material selected, for example, between thermoplastic polyurethane, TPU, and polyvinyl chloride, PVC.

The welt 517 allows to contrast the risk of delamination of the stratified structure of the insert for soles 10, in the region of the waterproof seal, in particular in the presence of auxiliary layers 12 between functional layers 11.

Figure 7:
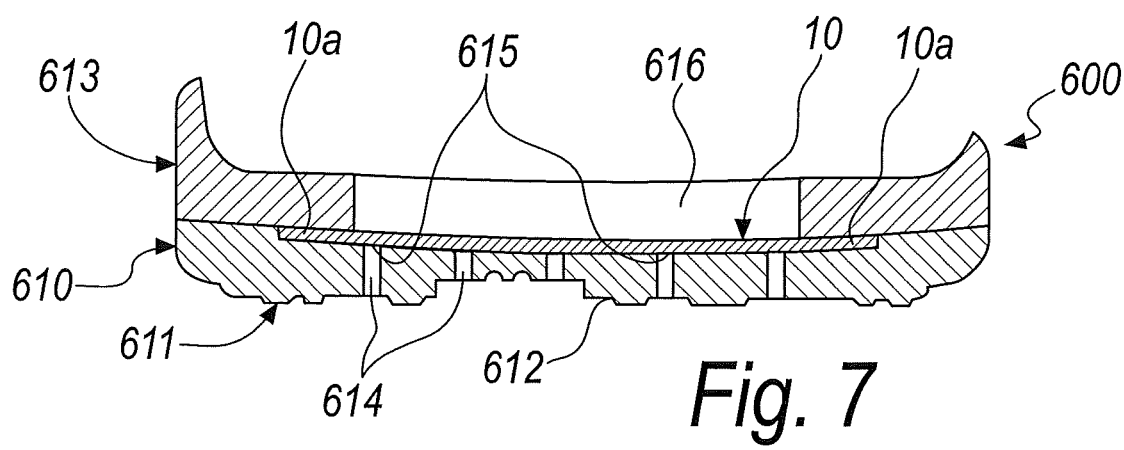

With particular reference to FIG. 7, a sixth sole structure 600 comprises a sole body 610, which is composed of a lower component 611, provided with a tread 612, and an upper component 613.

Advantageously, the upper component 613 is made of polymeric material, preferably ethyl vinyl acetate, EVA, or polyurethane, PU.

A plurality of openings 614 pass through the lower component 611, where their upper ends 615 are covered by an insert for soles 10 according to the invention.

The insert for soles 10, upon its waterproof connection to the sole body 610, has its peripheral region 10a comprised between the lower component 611 and the upper component 613.

Said sixth sole structure 600 can be provided by gluing or overmolding one of the lower components 611 or upper components 613 to the insert for soles 10, subsequently gluing or overmolding onto the semi-finished component the remaining component 611 or 613.

The upper component 613 is conveniently shaped as an annular rim of the vapor-permeable area indicated by the presence of the openings 614 and surrounds a vapor-permeable or perforated filler 616, which is arranged above the insert for soles 10.

It should be noted that both the fourth sole 400 and the sixth sole 600 allow to provide openings, respectively 414 and 614, which are shallow even in the presence of sole of considerable thickness.

The insert for soles 10 in fact is arranged inside the sole structure 400 or 600, surmounted by the filler which, during use, is interposed between said insert and the foot of the user.

In an alternative constructive solution, not shown in the accompanying figures, the upper component 613 covers completely the insert for soles 10, providing a central vapor-permeable region that is for example diffusely perforated, porous or net-like.

In these embodiments, the upper component 613 is provided by direct injection on the upper.

Figure 7A:
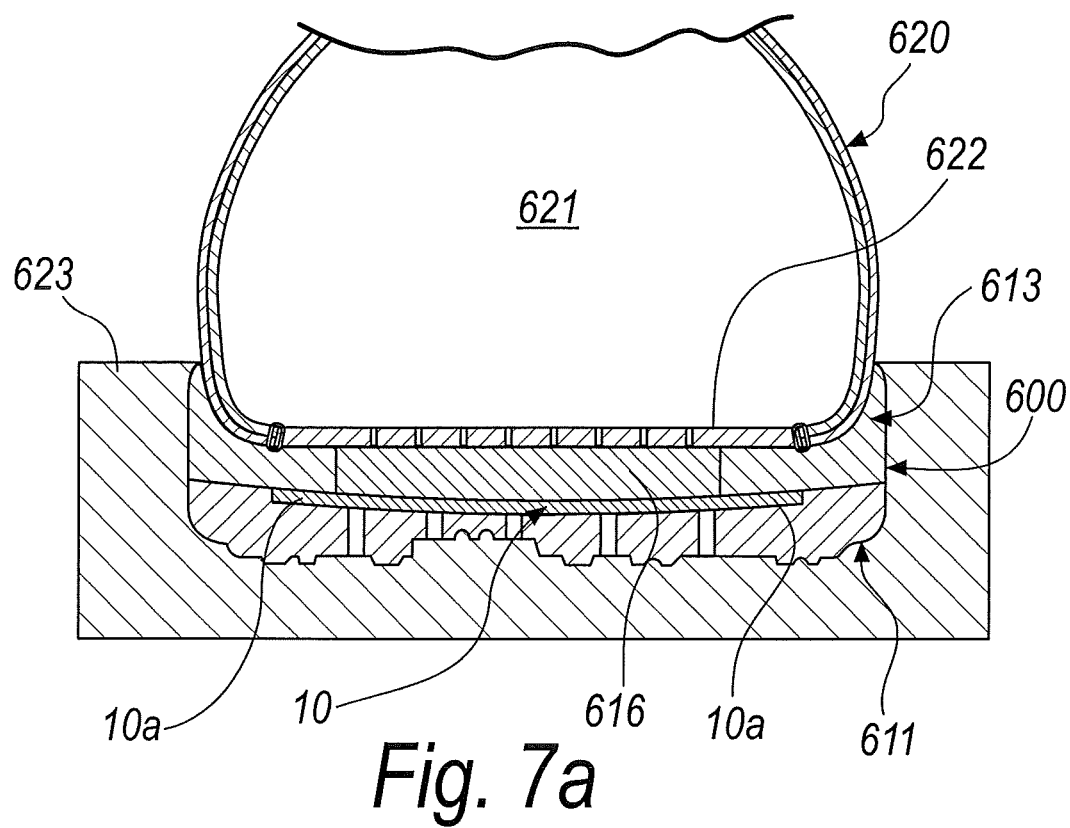
FIG. 7a is a schematic view of a step for providing a sixth one of said structure of soles with an insert for soles according to the invention.

By way of non-limiting example, FIG. 7a illustrates schematically a final step of the process for the injection-molding of the upper component 613 onto an upper 620 that is fitted on a last 621 and is sewn to the assembly insole 622, as is per se known.

A mold 623 is closed onto a portion of the upper 620 and onto the assembly insole 622, against which the filler 616 abuts and is superimposed on the insert for soles 10 connected to the lower component 611.

The material for forming the upper component 613 is injected into the mold 623 and connects, so as to form a seal, to the peripheral region 10a of the insert for soles 10.

Figure 8:
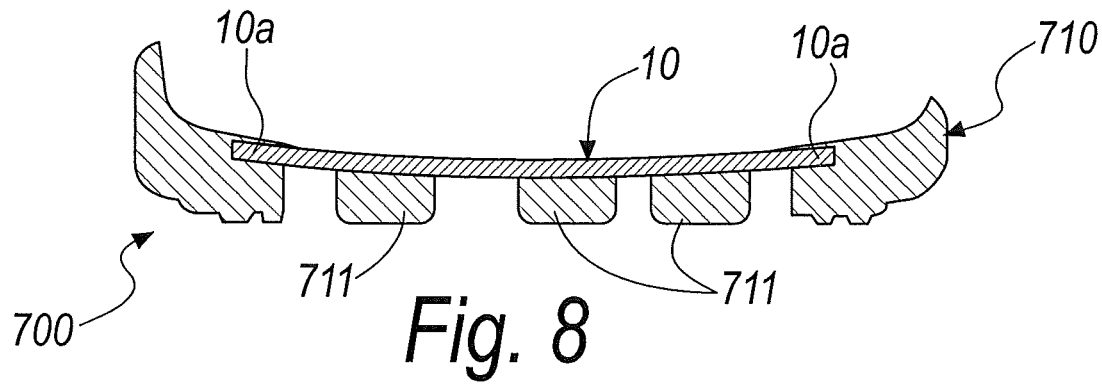
Figure 9:
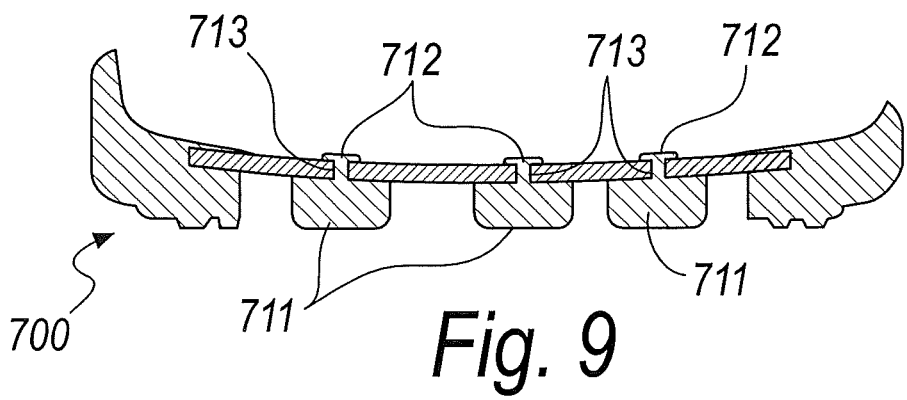
Figure 10:
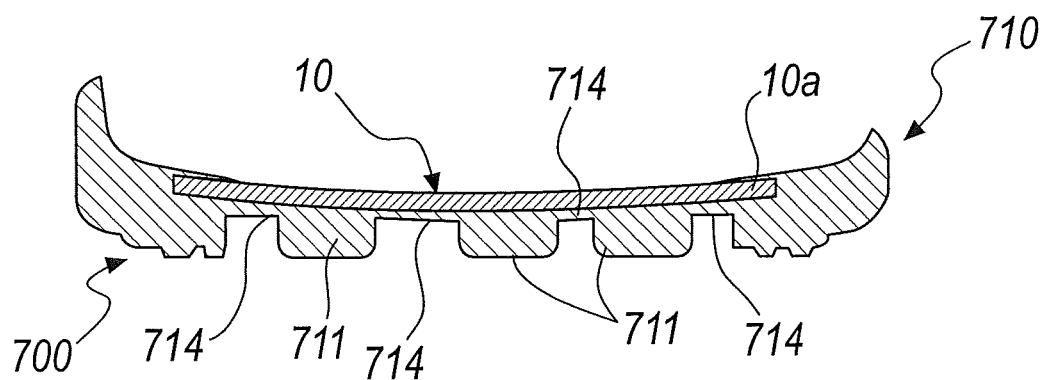
Figure 11:
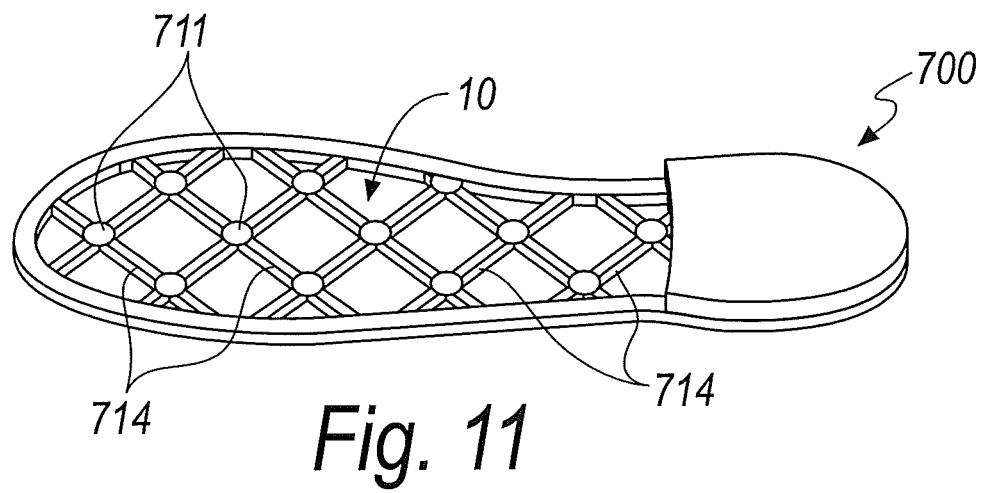
FIG. 11 is a perspective view of a third constructive variation of the seventh structure of soles comprising an insert for soles according to the invention.

FIGS. 8, 9 and 10 illustrate three constructive variations of a seventh sole structure 700, which comprises a sole body 710 that is shaped like a frame and surrounds an insert for soles 10 according to the invention embedding at least its peripheral region 10a, so as to seal thereto in a waterproof manner.

Said seal is obtained advantageously by co-molding of the body of the sole 710 with the insert for soles 10.

As an alternative to co-molding, in different constructive solutions the sole body 710 is glued to the peripheral region of the insert for soles 10.

Tread studs 711 made of polymeric material are adapted for resting on the ground and are associated with the insert for soles 10.

FIG. 8 illustrates by way of example a first variation of the seventh sole 700 in which the tread studs 711 are connected to the insert for soles 10, for example by adhesive bonding or overmolding and are separate from the sole body 710.

FIG. 9 illustrates by way of example a second variation of the seventh sole structure 700 provided with the tread studs 711, which are separate from the sole body 710 and are provided with hook-shaped pins 712, which are inserted so as to plug hermetically corresponding accommodation holes 713 provided through the insert for soles 10.

In alternative embodiments of the second variation of the seventh sole structure 700 not shown in the accompanying figures, the tread studs are advantageously mutually interconnected by an inner grid arranged above the insert for soles 10.

Conveniently, the tread studs 711 are formed by their injection overmolding onto the insert for soles 10.

FIG. 10 illustrates, by way of example, a third variation of the seventh sole structure 700, whose tread studs 711 are connected to the sole body 710 by way of transverse ribs 714, which conveniently form a grid on the insert for soles 10.

Figure 12:
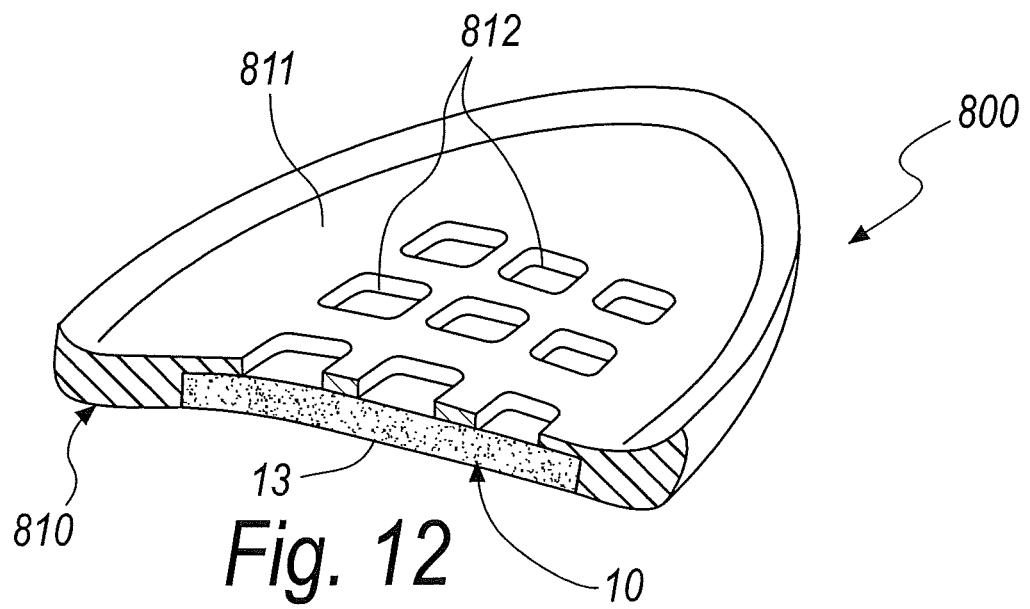
FIG. 12 is a partially sectional perspective view of a further embodiment of a structure of soles comprising an insert for soles according to the invention.

With particular reference to FIG. 12, said figure illustrates by way of non-limiting example an eighth sole structure 800, which comprises:
  a sole body 810, which has, in its upper portion 811, openings 812 that are adapted to allow the passage of water vapor, and
  an insert for soles 10, according to the invention, which covers them in a downward region.

A lower face 13 of the insert for soles 10 forms at least part of the tread of the sole 800.

Moreover, the insert for soles 10 is sealed to the sole body 810 so as to prevent the infiltration of water in the liquid state between them.

In practice it has been found that the invention achieves the intended aim and objects, providing a waterproof and vapor-permeable insert for soles that allows to provide vapor-permeable and waterproof soles that can dissipate larger quantities of water vapor than currently known vapor-permeable soles, thanks to the absence of supporting or reinforcement or protection layers, which limit the vapor permeability of the sole.

Moreover, an insert for soles, according to the invention, has been found to have a higher resistance to contamination by fatty substances than currently known inserts for soles, further having, with respect to said currently known inserts for soles, a higher resistance to degradation by solvents.

Moreover, an insert for soles according to the invention is structurally simpler than currently known inserts for soles.

An insert for soles according to the invention further has such a resistance to abrasion as to allow its use in shoes in which it is directly in contact with the ground, as a tread.

With respect to currently known inserts for soles, provided with protective layers of felt and other porous materials that tend to absorb liquids and moisture, an insert for soles according to the invention does not absorb and does not allow stagnation of liquid or wicking of water into the sole.

By not requiring the reinforcement and protection of reinforcement and protection layers, an insert for soles according to the invention has a larger vapor-permeable surface than an insert of the currently known type of equal extension, since in this part of the surface it is affected by glues and adhesives to the reinforcement and protection layers which hinder vapor permeation where they are present.

The invention thus conceived is susceptible of numerous modifications and variations, all of which are within the scope of the appended claims; all the details may further be replaced with other technically equivalent elements.

In practice, the materials used, so long as they are compatible with the specific use, as well as the contingent shapes and dimensions, may be any according to requirements and to the state of the art.

The disclosures in European Patent Application No. 09425334.1 from which this application claims priority are incorporated herein by reference.

Where technical features and methods mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. An insert for vapor-permeable and waterproof soles, having a stratified and cohesive monolithic sheet-like structure, comprising:

a plurality of waterproof and vapor permeable functional layers, each of the functional layers being made of a polymeric material that is permeable to water vapor and impermeable to water in the liquid state such that no water through passages are present in each of the functional layers, and water in the liquid state is prevented from passing in each of the functional layers from a first side surface of a respective functional layer to a second side surface of the respective functional layer opposite the first side surface; and at least one functional portion of said insert for soles having a thickness such as to give it a penetration resistance of more than approximately 10 N, assessed according to the method presented in chapter 5.8.2 of the ISO 20344-2004 standard, wherein the plurality of functional layers are adhered to each other to form the stratified and cohesive monolithic sheet-like structure.

2. The insert for soles according to claim 1, wherein said polymeric material is microporous expanded polytetrafluoroethylene, e-PTFE.

3. The insert for soles according to claim 1, wherein said polymeric material is selected from the group consisting of polyurethane, polyethylene, polypropylene, and polyester.

4. The insert for soles according to claim 1, further comprising at least one auxiliary layer, which is permeable to water vapor and is interposed between at least two of said waterproof and vapor permeable functional layers.

5. The insert for soles according to claim 4, wherein said at least one auxiliary layer is made of a material that is structured in fibers according to a woven or non-woven fabric configuration.

6. The insert for soles according to claim 4, wherein said at least one auxiliary layer is made of a material selected from the group consisting of polyolefins, nylon, polyester, aramid fibers, and fluoropolymers.

7. The insert for soles according to claim 6, wherein said polyolefins are selected between polyethylene and polypropylene.

8. The insert for soles according to claim 1, wherein the insert has a thickness, at least at said functional portion, substantially between 0.5 mm and 5 mm.

9. The insert for soles according to claim 1, wherein the insert is impermeable to water by having, according to the EN1734 standard, no through passage points when subjected to a pressure of at least 1 bar held for at least 30 seconds.

10. The insert for soles according to claim 1, wherein the insert has a bursting strength that is at least equal to 8 kgf/cm2, determined according to the ASTM D3786 standard.

11. The insert for soles according to claim 1, wherein the insert has a permeability to water vapor that is at least equal to 9 mg/cm2·h, determined according to the method presented in chapter 6.6 of the ISO 20344-2004 standard.

12. The insert for soles according to claim 1, wherein the insert has a tear strength of at least 10 N, determined according to the method described in the EN13571 standard.

13. The insert for soles according to claim 1, wherein the insert has, for thicknesses thereof between 1 mm and 5 mm, an abrasion resistance that corresponds to a mass loss of less than 250 mg, determined according to the method presented in the EN12770 standard.

14. The insert for soles according to claim 1, wherein the insert has a substantially uniform thickness.

15. A waterproof and vapor-permeable sole structure, comprising:

a sole body including, in a lower region, a tread, wherein said sole body includes at least one opening that is adapted for vapor permeation and is covered, in a manner that is impermeable to water in the liquid state, by an insert for soles that has a stratified and cohesive monolithic sheet-like structure, comprising a plurality of waterproof and vapor permeable functional layers, each of the functional layers being made of a polymeric material that is permeable to water vapor and impermeable to water in the liquid state such that no water through passages are present in each of the functional layers and water in the liquid state is prevented from passing in each of the functional layers from a first side surface of a respective functional layer to a second side surface of the respective functional layer opposite the first side surface, at least one functional portion of said insert for soles having such a thickness as to give it a penetration resistance of more than approximately 10 N, evaluated according to the method presented in chapter 5.8.2 of the ISO 20344-2004 standard, wherein the plurality of functional layers are adhered to each other to form the stratified and cohesive monolithic sheet-like structure.

16. The sole structure according to claim 15, wherein said sole body comprises a lower portion including said tread and an upper portion which accommodates said insert for soles that is sealed to it in a manner that is impermeable to water in the liquid state at its peripheral region.

17. The sole structure according to claim 15, further comprising a waterproof seal of the peripheral region of said insert for soles to said sole body.

18. The sole structure according to claim 17, wherein said seal comprises gluing with pressing of said peripheral region to said upper portion.

19. The sole structure according to claim 17, wherein said seal comprises a perimetric frame, which is in a single body with said sole body, is C-shaped, and surrounds said peripheral region, adhering thereto impermeably at least at a contact face thereof.

20. The sole structure according to claim 17, wherein said seal is provided by a sealing element that covers, connecting impermeably thereto, at least adjacent perimetric edges respectively of said insert for soles and of an upper portion of the sole body.

21. The sole structure according to claim 15, further comprising:
a composite insert that is sealed at least perimetrically to said sole body and comprises
an insert for soles,
a perimetric functional rim that is preassembled impermeably to said insert for soles,
said perimetric functional rim surmounting the peripheral region of said insert for soles.

22. The sole structure according to claim 15, wherein said sole body comprises a lower portion that includes said tread and an upper portion, said insert for soles having a peripheral region that is comprised between said lower portion and said upper portion so as to seal it impermeably to said sole body.

23. The sole structure according to claim 15, further comprising a filler that covers at least a central region of said insert for soles and has a vapor-permeable structure.

24. The sole structure according to claim 15, further comprising a sole body that is shaped like a frame that surrounds said insert for soles, embedding at least the peripheral region thereof and sealing itself impermeably thereto, tread studs made of polymeric material, adapted for resting on the ground, being associated with the insert for soles.

25. The sole structure according to claim 24, wherein said tread studs are separate from said sole body, being jointly connected to said insert for sole.

26. The sole structure according to claim 24, wherein said tread studs include through pins, which are inserted hermetically in corresponding accommodation holes provided through said insert for soles.

27. The sole structure according to claim 24, wherein said tread studs are connected to said sole body by transverse ribs that form a grid under said insert for soles.

28. The sole structure according to claim 15, further comprising a sole body that includes, in an upper portion thereof, said at least one opening covered in a downward region by said insert for soles, of which a lower face forms at least part of said tread, said insert for soles being sealed to said sole body so as to prevent infiltration of water in the liquid state between them.

29. The sole structure according to claim 20, wherein the upper portion includes a recess complementarily shaped so as to accommodate the insert for soles therein, and wherein the sealing element covers adjacent perimetric edges respectively of the insert for soles and recess.

30. The insert for soles according to claim 1, wherein the plurality of functional layers are adhered to each other without seams such that formation of a structure connecting interfaces of adjacent functional layers is promoted to form the stratified and cohesive monolithic sheet-like structure.

31. The sole structure according to claim 15, wherein the plurality of functional layers are adhered to each other without seams such that formation of a structure connecting interfaces of adjacent functional layers is promoted to form the stratified and cohesive monolithic sheet-like structure.

* * * * *

UNITED STATES PATENT AND TRADEMARK OFFICE
CERTIFICATE OF CORRECTION

PATENT NO. : 10,588,377 B2
APPLICATION NO. : 13/393041
DATED : March 17, 2020
INVENTOR(S) : Mario Polegato Moretti Page 1 of 1

It is certified that error appears in the above-identified patent and that said Letters Patent is hereby corrected as shown below:

On the Title Page

Item (75) the Inventor's information is incorrect. Item (75) should read:
--(75) Inventor: Mario Polegato Moretti, Crocetta del Montello (IT)--

Signed and Sealed this
Twelfth Day of May, 2020

Andrei Iancu
*Director of the United States Patent and Trademark Office*